UNITED STATES PATENT OFFICE.

JEAN A. MAIGNEN, OF PHILADELPHIA, PENNSYLVANIA.

PROCESS OF CLARIFYING AQUEOUS SOLUTIONS.

No. 875,088.  Specification of Letters Patent.  Patented Dec. 31, 1907.

Application filed April 18, 1900. Serial No. 13,293.

*To all whom it may concern:*

Be it known that I, JEAN A. MAIGNEN, of Philadelphia, in the State of Pennsylvania, have invented certain new and useful Improvements in Process of Clarifying Aqueous Solutions, whereof the following is a specification.

My invention relates to processes of clarification wherein chemicals are employed to coagulate the matter suspended in water.

Ordinarily the water to be clarified is subjected to the action of the coagulant in either one of two ways, that most commonly employed being to primarily dissolve the coagulant in a given quantity of water, and to then add the liquefied coagulant to the water to be clarified. It is found in practice that such a process gives results which are far from uniform or satisfactory, for the reason that when freshly made and agitated in a tank, the liquefied coagulant may be of the same density throughout, but immediately becomes denser at the bottom and lighter at the top, when the agitation ceases, so that the strength of the liquefied coagulant added to the water at a given instant, is dependent upon the particular strata from which it is withdrawn, and corresponding irregularities of coagulating action and effluent product necessarily result. The second ordinary method of subjecting water to the action of the coagulant, is to place the latter in crystal form in an inclosure, through which the water to be clarified is caused to flow. It is found in practice that under such circumstances the coagulating action is irregular in correspondence with the quantity of the crystallized coagulant presented at a given instant to the flow of water, such action being of course stronger when the inclosure is quite full than when a part of the coagulating crystals have been dissolved, and carried away. It is characteristic of both of the well known processes aforesaid, that at times the effluent contains four or five times the quantity of the coagulant which is actually required, for the purpose of clarification, and at other times, the effluent does not contain sufficient of the coagulant to effect the clarification.

It is the object of my invention to secure the uniform clarification of given quantities of water with a minimum expenditure of chemicals, and to this end, my improved process consists in adding to the water, to be treated, a plurality of distinct chemicals in a dry comminuted state, in predetermined quantities, and in such relation that the water is subjected to the combined coagulating action of said chemicals; said chemicals being sulfate of alumina, and soda ash, preferably mixed in the proportion of 2.9 of the former to 3.1 of the latter.

I am aware that sulfate of alumina and alum have been hitherto used for the clarification of water; it has been found in practice however, that a part thereof combines with lime present in the water and forms sulfate of lime, rendering the effluent not only prejudicial to health, but also commercially undesirable, by reason of its incrustation of boilers, etc. I have found that when the two reagents above specified are used in the preferred proportions, they neutralize one another, so that even if an excess of the combination thereof be added to the water, the latter after treatment, is neither acids or alkaline. The full benefit of all of the possible chemical decompositions and reactions is obtained when said two chemicals in a dry comminuted form, are added to the water simultaneously. The carbonic acid which is immediately liberated serves not only to agitate all the body of the water by its tendency to rise, but also helps to more completely distribute the precipitate and increase its coagulating effect.

Although it is desirable that the process herein described be carried out in apparatus comprising means to automatically predetermine the quantities of the chemicals added to the water, in course of treatment, it is obvious that the predetermined quantities of said chemicals may be added to the water manually, and that the particular form of apparatus employed forms no part of my present invention.

I have herein used the term aqueous solutions, as comprehensive of any liquid containing matter in suspension, which may be precipitated by the employment of the chemicals specified, and, it is to be understood that in the following claims, the term soda ash is comprehensive of carbonate of soda or the equivalent thereof.

I claim:—

1. The hereinbefore described process of producing practically neutral potable water which consists in subjecting soft dirty water to the contemporaneous action of sulfate of alumina and soda ash, mixed in definite proportions, by adding said chemicals in a dry comminuted state to the water, substantially as set forth.

2. The hereinbefore described process of producing practically neutral potable water, which consists in subjecting soft dirty water to the contemporaneous action of sulfate of alumina and soda ash, by mixing said chemicals in the proportions of 2.9 of the former and 3.1 of the latter and adding said mixture in a dry comminuted state to the water, substantially as set forth.

3. The process of producing practically neutral potable water which consists in adding to soft dirty water sulfate of alumina and soda ash, in a dry comminuted state, previously mixed in predetermined definite proportions, substantially as set forth.

JEAN A. MAIGNEN.

Witnesses:
  ARTHUR E. PAIGE,
  E. L. FULLERTON.